US012608020B2

(12) United States Patent　(10) Patent No.: US 12,608,020 B2
McNew　(45) Date of Patent: Apr. 21, 2026

(54) SYSTEM AND METHOD FOR CONTROLLING AN AERIAL DRONE FOR EXPLORING OFF-ROAD TRAILS

(71) Applicant: Toyota Motor Engineering & Manufacturing North America, Inc., Plano, TX (US)

(72) Inventor: John-Michael McNew, Ann Arbor, MI (US)

(73) Assignees: Toyota Motor Engineering & Manufacturing North America, Inc., Plano, TX (US); Toyota Jidosha Kabushiki Kaisha, Toyota (JP)

(*) Notice: Subject to any disclaimer, the term of this patent is extended or adjusted under 35 U.S.C. 154(b) by 65 days.

(21) Appl. No.: 18/630,046

(22) Filed: Apr. 9, 2024

(65) Prior Publication Data

US 2025/0315059 A1　Oct. 9, 2025

(51) Int. Cl.
G05D 1/639　(2024.01)
G05D 107/30　(2024.01)

(52) U.S. Cl.
CPC ......... G05D 1/639 (2024.01); G05D 2107/30 (2024.01)

(58) Field of Classification Search
CPC ...... G05D 1/639; G05D 2107/30; G05D 1/00; G05D 1/02
See application file for complete search history.

(56) References Cited

U.S. PATENT DOCUMENTS

| | | | | |
|---|---|---|---|---|
| 10,173,776 B2 * | 1/2019 | Goldberg | ............... | G05D 1/102 |
| 10,192,182 B2 * | 1/2019 | Whipple | ............... | G06Q 50/06 |
| 10,585,439 B2 * | 3/2020 | Buttolo | ............... | G05D 1/0246 |
| 10,593,216 B2 * | 3/2020 | Chow | ....................... | G08G 5/22 |
| 10,642,279 B2 | 5/2020 | Lockwoord et al. | | |
| 10,936,176 B1 | 3/2021 | Clark et al. | | |
| 10,983,201 B2 | 4/2021 | Pimentel et al. | | |

(Continued)

FOREIGN PATENT DOCUMENTS

| | | |
|---|---|---|
| CN | 105185143 A | 12/2015 |
| CN | 110597275 A | 12/2019 |

(Continued)

OTHER PUBLICATIONS

Brahmbhatt et al., Neural network approach for vision-based track navigation using low-powered computers on mavs, 2017, IEEE, p. 578-583 (Year: 2017).*

(Continued)

*Primary Examiner* — Mcdieunel Marc
(74) *Attorney, Agent, or Firm* — Christopher G. Darrow; Darrow Mustafa PC

(57) ABSTRACT

A system includes a processor and a memory in communication with the processor. The memory includes instructions that cause the processor to determine, based on images of an off-road trail captured by an aerial drone in communication with a vehicle, whether the off-road trail has a positive condition indicating that the vehicle can traverse the off-road trail or an abandonment condition indicating that the vehicle cannot traverse the off-road trail. Depending on the determination, the processor either controls the aerial drone to navigate along the off-road trail or controls the aerial drone to navigate to a different off-road trail.

20 Claims, 8 Drawing Sheets

(56) References Cited

U.S. PATENT DOCUMENTS

| | | | |
|---|---|---|---|
| 11,074,811 B2 * | 7/2021 | Fowe | G06V 20/17 |
| 11,164,149 B1 * | 11/2021 | Williams | G06K 19/06028 |
| 11,415,989 B2 * | 8/2022 | Bennie | B64D 1/18 |
| 11,453,494 B2 | 9/2022 | Bouffard et al. | |
| 11,465,740 B2 * | 10/2022 | Perez Barrera | G01C 21/34 |
| 11,557,211 B2 * | 1/2023 | Chow | G08G 5/55 |
| 11,644,839 B2 | 5/2023 | Zhao et al. | |
| 11,797,019 B2 | 10/2023 | Parenti et al. | |
| 12,154,443 B2 * | 11/2024 | Yocam | H04W 4/70 |
| 12,361,505 B2 * | 7/2025 | Hart | H04W 4/38 |
| 2018/0107209 A1 * | 4/2018 | Hardee | G08G 1/20 |
| 2019/0197890 A1 * | 6/2019 | Du | G05D 1/12 |
| 2019/0227555 A1 | 7/2019 | Sun et al. | |
| 2019/0344679 A1 * | 11/2019 | Miller | B64U 70/93 |
| 2019/0348857 A1 * | 11/2019 | Dudar | B64U 10/13 |
| 2020/0398985 A1 | 12/2020 | Hsu | |
| 2021/0165426 A1 * | 6/2021 | White | G05D 1/101 |
| 2021/0278834 A1 | 9/2021 | Kendoul et al. | |
| 2021/0325898 A1 | 10/2021 | Golov | |
| 2024/0255205 A1 * | 8/2024 | Jervas | B64U 20/87 |

FOREIGN PATENT DOCUMENTS

| | | |
|---|---|---|
| CN | 111086518 B | 5/2022 |
| KR | 20220166689 A | 8/2023 |

OTHER PUBLICATIONS

Sharma et al., CaT: CAVS Traversability Dataset for Off-Road Autonomous Driving, 2022, IEEE, p. 24759-24768 (Year: 2022).*
Carruth et al., Challenges in Low Infrastructure and Off-Road Automated Driving, 2022, IEEE, p. 13-20 (Year: 2022).*
Giusti et al., A Machine Learning Approach to Visual Perception of Forest Trails for Mobile Robots, 2016, IEEE, p. 661-667 (Year: 2016).*
Berteska, et al., "Photogrammetric Mapping Based on UAV Imagery", Geodesy and Cartography, 2013, 6 pages.

\* cited by examiner

SYSTEM AND METHOD FOR CONTROLLING AN AERIAL DRONE FOR EXPLORING OFF-ROAD TRAILS

TECHNICAL FIELD

The subject matter described herein relates, in general, to systems and methods for controlling an aerial drone for exploring off-road trails.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some vehicles have the appropriate capabilities that allow them to travel off-road. In some cases, these vehicles may travel down off-road trails whose conditions can vary significantly. For example, some off-road trails are readily traversable by vehicles under appropriate weather conditions, such as dry weather conditions. However, in other cases, the same off-road trail may become much more difficult to traverse under rainy conditions. Further still, debris, such as fallen trees, rocks, etc., may routinely make a once traversable off-road trail unpassable.

Generally, vehicles that are operating on these types of trails may have to turn around or operate in reverse when reaching a portion of the off-road trail that their vehicle cannot traverse. This can be somewhat frustrating to the occupant of the vehicle and may create a dangerous situation where the vehicle may need to operate in reverse for lengthy periods.

SUMMARY

This section generally summarizes the disclosure and is not a comprehensive explanation of its full scope or all its features.

In one embodiment, a system includes a processor and a memory in communication with the processor. The memory includes instructions that cause the processor to determine, based on images of an off-road trail captured by an aerial drone in communication with a vehicle, whether the off-road trail has a positive condition indicating that the vehicle can traverse the off-road trail or an abandonment condition indicating that the vehicle cannot traverse the off-road trail. Depending on whether the off-road trail has a positive condition or an abandonment condition, the processor either controls the aerial drone to navigate along the off-road trail or controls the aerial drone to navigate to a different off-road trail.

In another embodiment, a method for controlling an aerial drone includes the step of determining, based on images of an off-road trail captured by an aerial drone in communication with a vehicle, whether the off-road trail has a positive condition indicating that the vehicle can traverse the off-road trail or an abandonment condition indicating that the vehicle cannot traverse the off-road trail. Like before, depending on whether the off-road trail has a positive condition or an abandonment condition, the method either performs the step of controlling the aerial drone to navigate along the off-road trail or performs the step of navigating the aerial drone to a different off-road trail.

In yet another embodiment, a non-transitory computer-readable medium includes instructions that, when executed by a processor, causes the processor to determine, based on images of an off-road trail captured by an aerial drone in communication with a vehicle, whether the off-road trail has a positive condition indicating that the vehicle can traverse the off-road trail or an abandonment condition indicating that the vehicle cannot traverse the off-road trail. Again, depending on whether the off-road trail has a positive condition or an abandonment condition, the processor either controls the aerial drone to navigate along the off-road trail or controls the aerial drone to navigate to a different off-road trail.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described are systems and methods for controlling an aerial drone that can be used for exploring off-road trails. Off-road trails, which may be paths or routes that may be traveled by vehicles with appropriate off-road capabilities, are typically unpaved, are not gravel roads, and can vary in difficulty. Off-road trails may differ from traditional roads as they are not approved for all automobiles to utilize. In some cases, off-road trails can differ from traditional roads in that they are not paved and cannot be paved. For example, dirt/gravel roads can be paved, but off-road trails generally cannot.

Additionally, off-road trails may only be minimally maintained, so changes in weather, use, and other factors may diminish the accessibility of these off-road trails and/or prevent even vehicles with appropriate off-road capabilities from traversing. As such, as explained in the background section, there may be situations where the vehicle is traveling along an off-road trail that can no longer be traversed. When this occurs, the vehicle either has to turn around or operate in reverse, which can reduce the overall enjoyment of utilizing the off-road trail and/or cause unsafe situations.

The systems and methods described herein allow an occupant of the vehicle to control an aerial drone that can navigate ahead of the vehicle along the off-road trail and capture images that can be utilized to determine if the trail has either positive or abandonment conditions. Positive conditions can include the ability of the vehicle to traverse the trail and/or other favorable conditions, such as a good area for camping, resting, fishing, etc. Abandonment conditions can generally include conditions where the vehicle will not be able to traverse the off-road trail. As such, the occupant of the vehicle can determine if an off-road trail can be traversed before actually reaching the un-traversable portion of the off-road trail. In addition, the system and method may be able to generate sparse maps of the images captured by the aerial drone to provide visual information regarding the off-road trail. Information regarding positive and/or abandonment conditions may be provided by over-laying this information in the sparse map.

Figure 1:
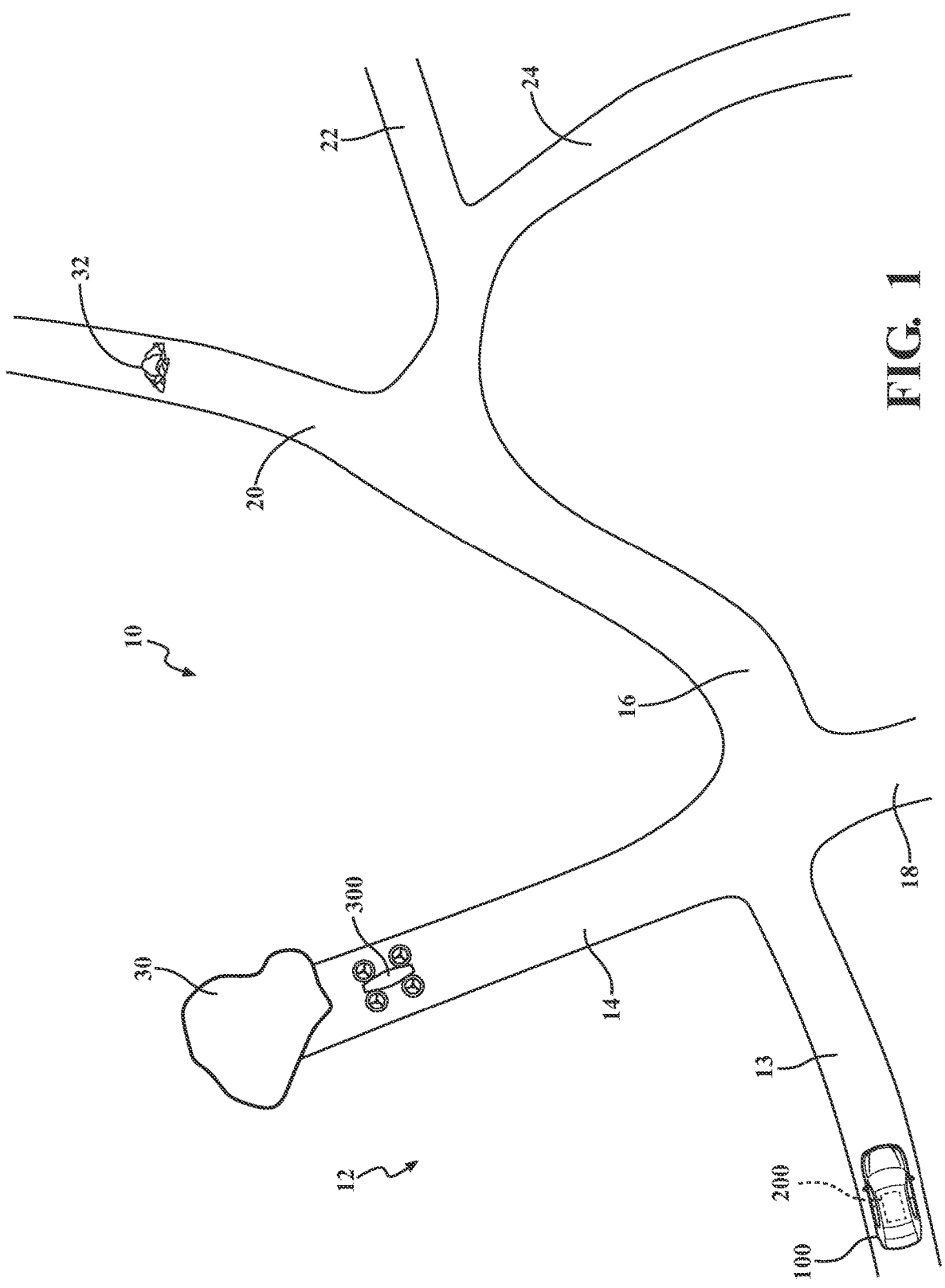
FIG. 1 illustrates a scenario wherein a vehicle includes a drone control system for controlling an aerial drone for exploring off-road trails.

Referring to FIG. 1, illustrated is a scenario 10, including an off-road trail system 12 that includes numerous off-road trails, such as off-road trails 13, 14, 16, 18, 20, 22, and 24. Also illustrated is a vehicle 100, which includes a drone control system 200, which allows an occupant of the vehicle 100 to control an aerial drone 300. The vehicle 100 can be any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport. As such, in some cases, the vehicle 100 may be an automobile with appropriate off-road capabilities or could be a dedicated off-road vehicle that may be limited from accessing public roads, such as expressways, highways, etc.

The aerial drone 300, as will be explained in greater detail later, can be any type of drone capable of aerial flight. In one example, the aerial drone 300 may be an unmanned aerial vehicle that can operate either autonomously or by remote control. Typically, the occupant of the vehicle 100 may provide some basic instructions for controlling the aerial drone 300, and one or more autonomous or semi-autonomous control systems may help guide the aerial drone 300 based on or in lieu of instructions from the occupant of the vehicle 100.

As mentioned before, the off-road trail system 12 includes numerous off-road trails, such as off-road trails 13, 14, 16, 18, 20, 22, and 24. Here, the off-road trails 13, 14, 16, 18, 20, 22, and 24 are connected through a series of intersections or other branches. In this example, the vehicle 100 is located on off-road trail 13 before it splits into off-road trails 14, 16, and 18. Also shown in the off-road trail system 12 are encumbrances, such as a flooded area 30 and a rockslide area 32. Essentially, the flooded area 30 and the rockslide area 32 prevent the vehicle 100 from traveling further along the off-road trails 14 and 20, respectively. As will be explained in greater detail later in this description, the drone control system 200 allows for the control of the aerial drone 300 to identify these abandonment conditions and provide them to the occupant of the vehicle 100 so that the occupant of the vehicle can determine what off-road trails they should guide the vehicle 100 along.

Moreover, by having knowledge that encumbrances essentially block off-road trails 14 and 20, the driver may instead choose to explore off-road trails 16, 18, 22, and/or 24 which have no abandonment conditions. As such, the occupant can avoid selecting off-road trails that will require the occupant to turn the vehicle 100 around or operate the vehicle 100 in reverse. In addition, as will be explained in greater detail later, the drone control system 200 also allows for the identification of positive conditions, such as conditions that indicate that the vehicle 100 will be able to traverse a particular off-road trail or other positive conditions, such as a good area for camping, fishing, resting, etc.

Figure 2:
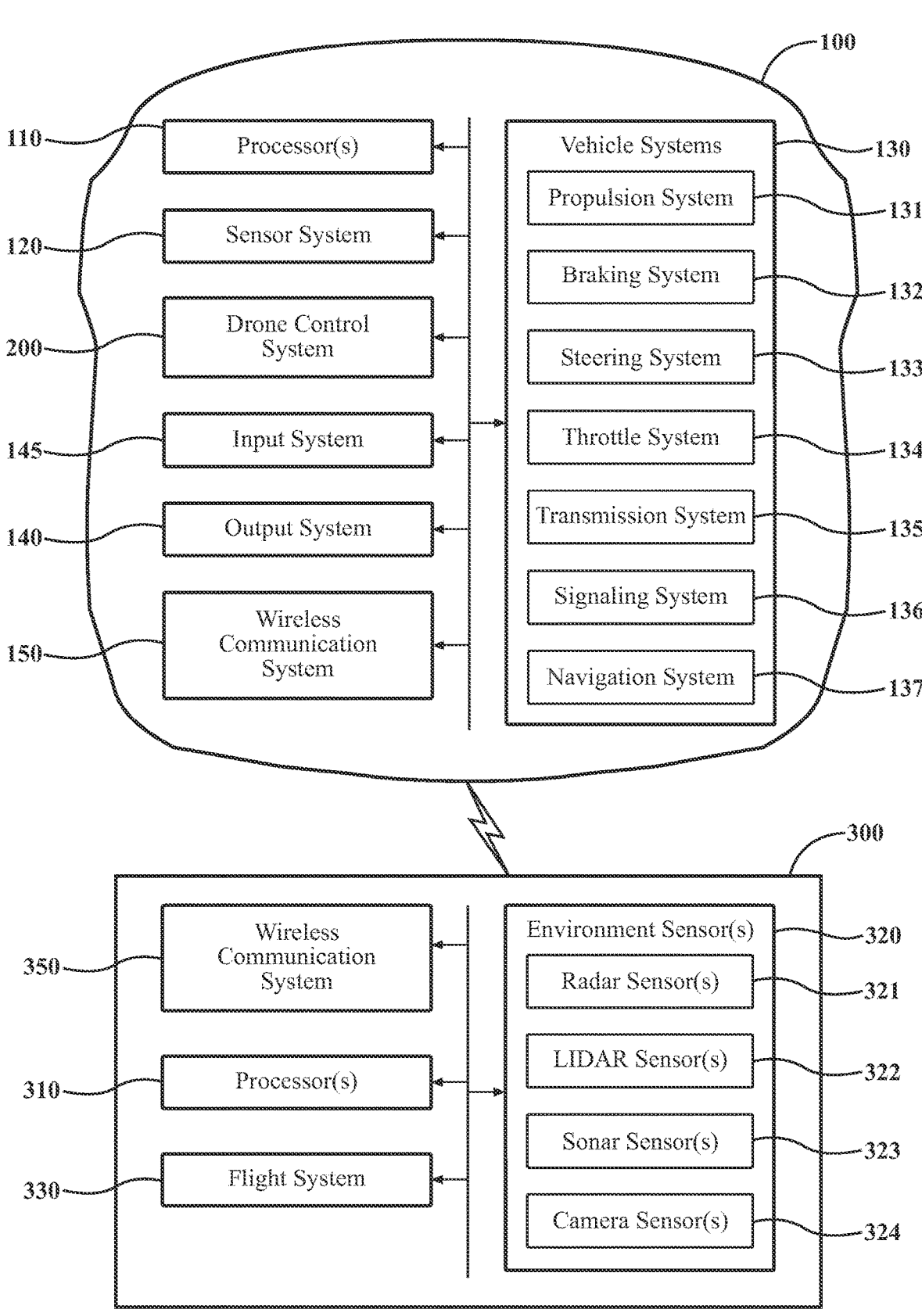
FIG. 2 illustrates a block diagram of the vehicle that includes the drone control system and the aerial drone.

Referring to FIG. 2, illustrated are block diagrams of the vehicle 100 and the aerial drone 300. It should be understood that in various embodiments it may not be necessary for the vehicle 100 and/or the aerial drone 300 to have all of the elements shown in FIG. 2. The vehicle 100 and/or the aerial drone 300 can have any combination of the various elements shown in FIG. 2. Further, the vehicle 100 and/or the aerial drone 300 can have additional elements to those shown in FIG. 2. In some arrangements, the vehicle 100 and/or the aerial drone 300 may be implemented without one or more of the elements shown in FIG. 2. While the various elements are shown as being located within the vehicle 100 and/or the aerial drone 300 in FIG. 2, it will be understood that one or more of these elements can be located external to the vehicle 100 and/or the aerial drone 300. Further, the elements shown may be physically separated by large distances and provided as remote services (e.g., cloud-computing services).

Regarding the vehicle 100, the vehicle 100 may include one or more processor(s) 110. In one example, the processor(s) 110 can be an electronic control unit (ECU). The vehicle 100 can include a sensor system 120. The sensor system 120 can include one or more sensors. "Sensor" means any device, component, and/or system that can detect, and/or sense something. The one or more sensors can be configured to detect, and/or sense in real time. As used herein, the term "real-time" means a level of processing responsiveness that a user or system senses as sufficiently immediate for a particular process or determination to be made, or that enables the processor to keep up with some external process.

The vehicle 100 can include one or more vehicle systems 130. Various examples of the one or more vehicle systems 130 are shown in FIG. 2. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 131, a braking system 132, a steering system 133, a throttle system 134, a transmission system 135, a signaling system 136, and/or a navigation system 137. Each of these systems can include one or more devices, components, and/or a combination thereof, now known or later developed.

The vehicle 100 can include an input system 145. An "input system" includes any device, component, system, element, arrangement or groups thereof that enable information/data to be entered into a machine. The input system 145 can receive an input from a vehicle occupant (e.g., a driver or a passenger). The vehicle 100 can include an output system 140. An "output system" includes any device, component, arrangement or groups thereof that enable information/data to be presented to a vehicle passenger (e.g., a person, a vehicle passenger, etc.). As will be explained later in this description, the output system 140 may be a display that can display a sparse map to an occupant of the vehicle 100 generated from images captured by the aerial drone 300. The occupant may utilize the input system 145 to manipulate the sparse map and/or control the operation of the aerial drone 300.

The vehicle 100 may also include a wireless communication system 150. The wireless communication system 150 includes appropriate hardware and software that allows various components of the vehicle 100 to communicate wirelessly with external devices, such as the aerial drone 300.

The vehicle 100 also includes a drone control system 200. As will be described later after describing the aerial drone 300, the drone control system 200 essentially controls the operation of the aerial drone 300 and processes information from the aerial drone 300. In this example, the drone control system 200 is shown incorporated within the vehicle 100. However, it may be possible that the drone control system 200 is located either entirely or partially outside the vehicle 100. For example, certain components and/or functions performed by the drone control system 200 may be performed by one or more systems and subsystems located within the aerial drone 300.

Turning attention to the aerial drone 300, the aerial drone 300, similar to the vehicle 100, also includes one or more processor(s) 310. The processor(s) 310 may be used to control a flight system 330, which can include propellers, rotors, or other hardware that allows for the movement of the aerial drone 300. The drone also includes one or more environment sensor(s) 320 that can acquire data or information about the external environment in which the aerial drone 300 is located or one or more portions thereof. As an example, in one or more arrangements, the environment sensor(s) 320 can include one or more radar sensor(s) 321, one or more LIDAR sensor(s) 322, one or more sonar sensor(s) 323, and/or one or more camera sensor(s) 324. In one or more arrangements, the one or more camera sensor(s) 324 can be high dynamic range (HDR) cameras or infrared (IR) cameras.

Like the vehicle 100, the aerial drone 300 includes a wireless communication system 350. The wireless communication system 350 includes appropriate hardware and software that allows various components of the aerial drone 300 to communicate wirelessly with external devices, such as the vehicle 100 and/or components of the vehicle 100. Generally, when deployed, the aerial drone 300 is in constant communication with the drone control system 200.

The aerial drone 300 may be launched from the vehicle 100. Moreover, the vehicle 100 may include a docking station that allows the aerial drone 300 to be selectively attached to the vehicle 100. As such, when deployed, the aerial drone 300 can navigate away from the vehicle 100 and, when in recovery mode, can navigate towards the vehicle 100 and mate with the docking station when not in use. Alternatively, the aerial drone 300 may be a more traditional drone that can be stored within the vehicle 100 and then deployed more manually by the occupant of the vehicle 100 when desired.

Returning to the vehicle 100 and the drone control system 200, as mentioned previously, the drone control system 200 is generally located within the vehicle 100. However, it should be understood that components of the drone control system 200 and/or functions performed by the drone control system 200 may be performed by components located outside the vehicle 100, such as components located within the aerial drone 300.

Figure 3:
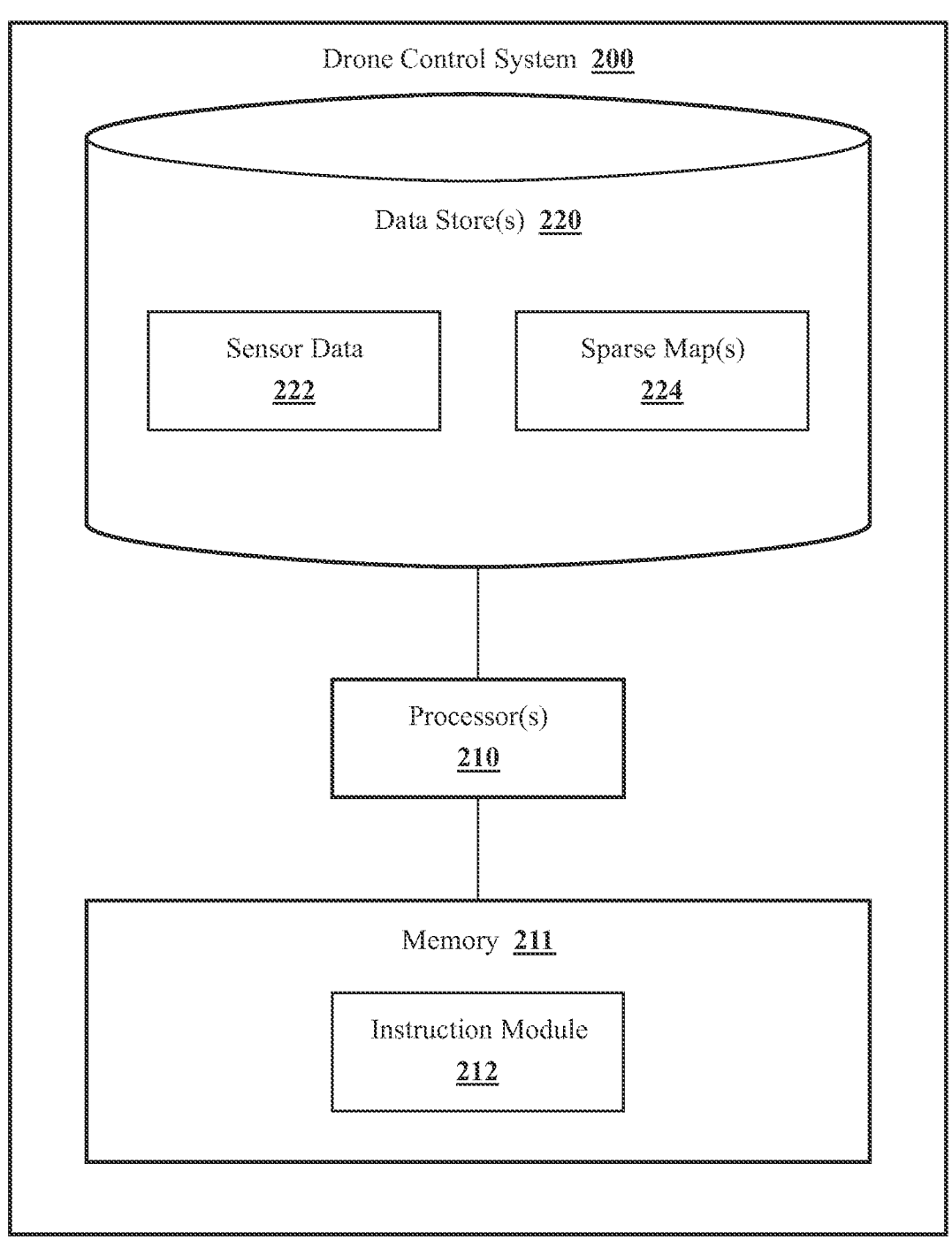
FIG. 3 illustrates a more detailed view of the drone control system.

With reference to FIG. 3, one embodiment of the drone control system 200 is further illustrated. As shown, the drone control system 200 includes one or more processor(s) 210. Accordingly, the processor(s) 210 may be a part of the drone control system 200 or the drone control system 200 may access the processor(s) 210 through a data bus or another communication path. For example, the processor(s) 210 may, in fact, be the processor(s) 110 of the vehicle 100 or may be a separate processor as shown. In one or more embodiments, the processor(s) 210 is an application-specific integrated circuit that is configured to implement functions associated with an instruction module 212. In general, the processor(s) 210 is an electronic processor, such as a microprocessor, which is capable of performing various functions as described herein. In one embodiment, the drone control system 200 includes a memory 211 that stores the instruction module 212. The memory 211 may be a random-access memory (RAM), read-only memory (ROM), a hard disk drive, a flash memory, or other suitable memory for storing the instruction module 212. The instruction module 212 is, for example, computer-readable instructions that, when executed by the processor(s) 210 cause the processor(s) 210 to perform the various functions disclosed herein.

Furthermore, in one example, the drone control system 200 includes one or more data store(s) 220. The data store(s) 220 is, in one embodiment, an electronic data structure such as a database that is stored in the memory 211 or another memory and that is configured with routines that can be executed by the processor(s) 210 for analyzing stored data, providing stored data, organizing stored data, and so on. Thus, in one embodiment, the data store(s) 220 stores data used and/or generated in executing various functions. In one example, the data store(s) 220 includes sensor data 222 and/or one or more sparse map(s) 224. The sensor data 222 can be sensor data collected from the aerial drone 300. For example, data collected from one or more of the environment sensor(s) 320 of the aerial drone 300 may be sent to the drone control system 200 through a wireless communication link. The sparse map(s) 224, as explained later, may be generated using the sensor data 222.

As mentioned before, the instruction module 212 includes instructions that, when executed by the processor(s) 210, cause the processor(s) 210 to perform the functions described herein. In one example, the instruction module 212 includes instructions that cause the processor(s) 210 to control the aerial drone 300 and collect information from the aerial drone 300 that can be useful when exploring off-road trails, such as the off-road trails 13, 14, 16, 18, 20, 22, and 24 forming the off-road trail system 12 shown in FIG. 1.

To better understand the features and functions of the drone control system 200 of FIG. 2, reference will be made to FIG. 4A-4E. In one example, the instruction module 212 includes instructions that cause the processor(s) 210 to cause the aerial drone 300 to take flight and proceed along the off-road trail. The aerial drone 300 is configured to capture sensor data 222 that may be in the form of one or more images captured by the camera sensor(s) 324 of the off-road trail and send these images to the drone control system 200, where they may be processed. Alternatively, processing of the images that form the sensor data 222 may be performed on board the aerial drone 300, such as by the processor(s) 310 of the aerial drone 300. In one example, when the aerial drone 300 collects the images, the images are geo-tagged with the position of the camera sensor(s) 324 and the height of the aerial drone 300 when the image is captured.

As such, in one example, the instruction module 212 includes instructions that cause the processor(s) 210 to receive images that form the sensor data 222 from the aerial drone 300. Once received, the instruction module 212 includes instructions that cause the processor(s) 210 to essentially process the sensor data 222. In one example, the processing of the sensor data 222 by the processor(s) 210 can include determining, based on images of the sensor data

222, the presence of an off-road trail and whether the off-road trail has a positive condition indicating that the vehicle 100 can traverse the off-road trail or an abandonment condition indicating that the vehicle 100 cannot traverse the off-road trail. In addition, the instruction module 212 includes instructions that cause the processor(s) 210 to generate a sparse map from the sensor data 222.

Figure 4A:
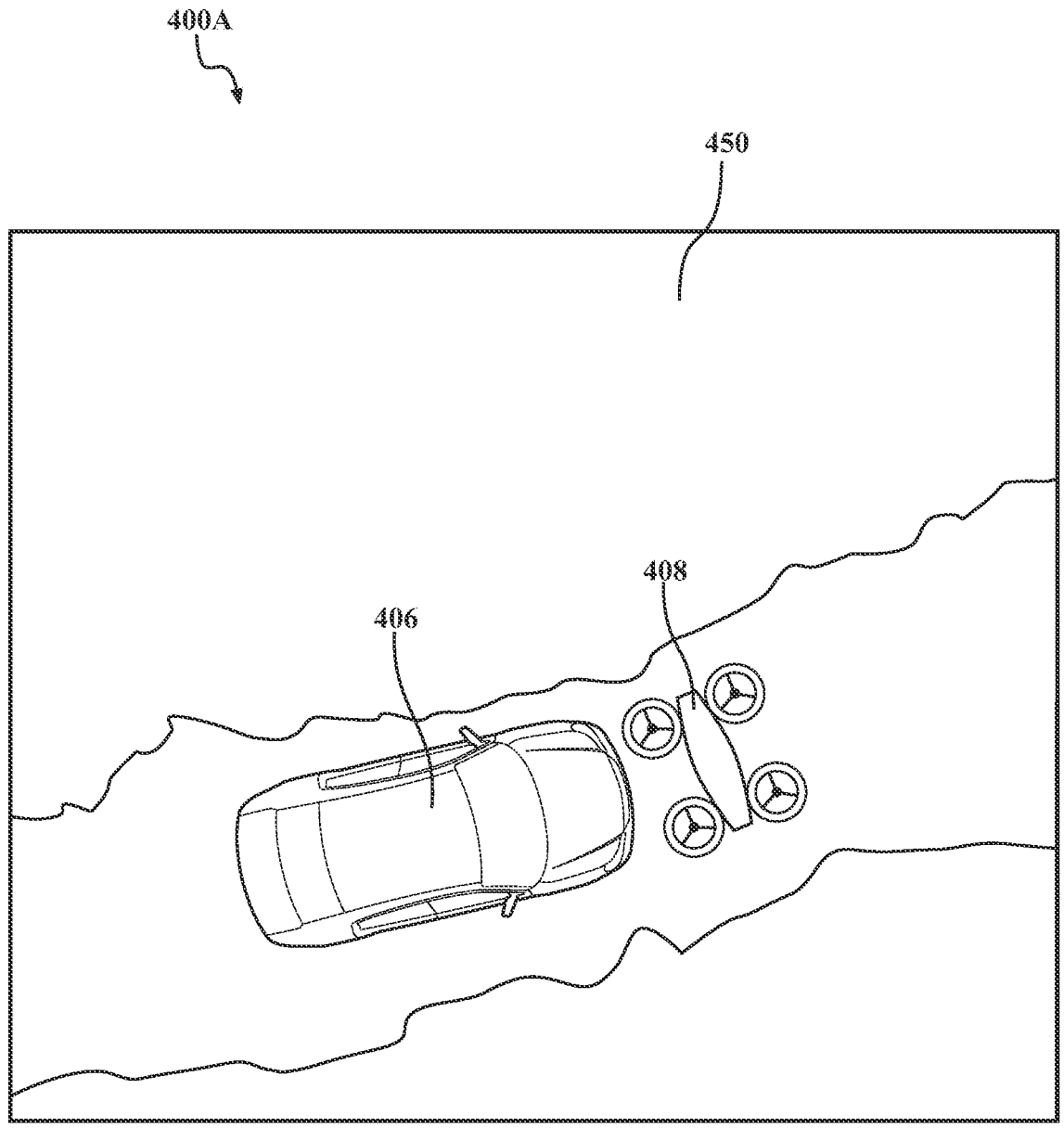
FIGS. 4A-4E illustrate the construction of a sparse map utilizing the drone control system.
Figure 4B:
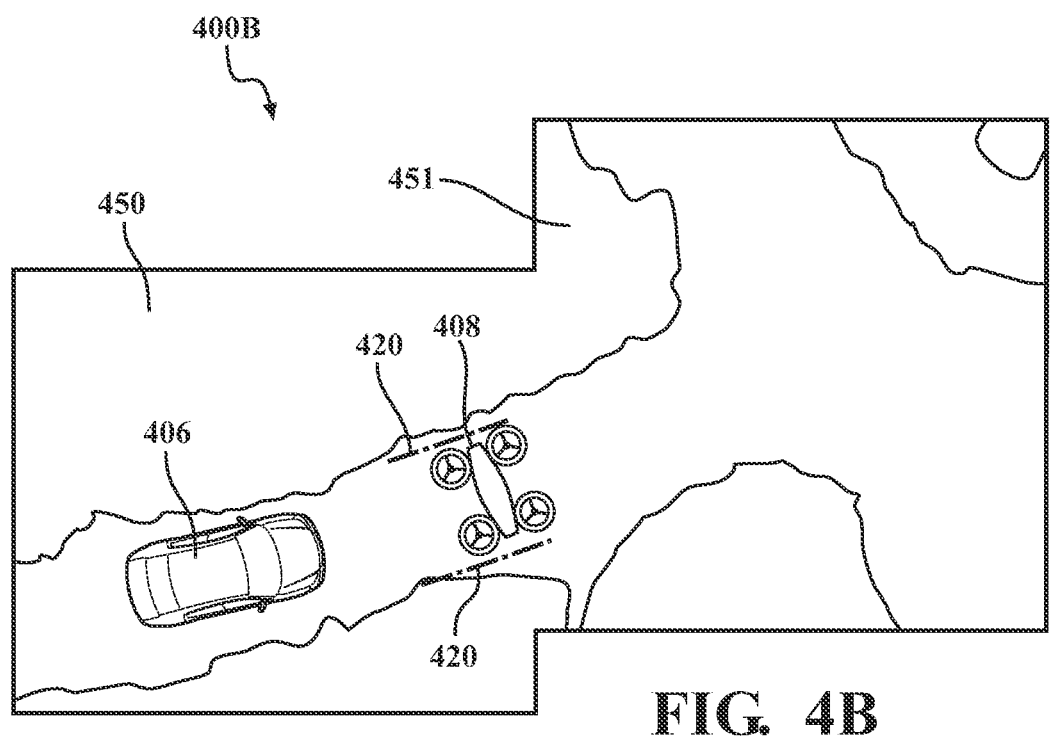
Figure 4C:
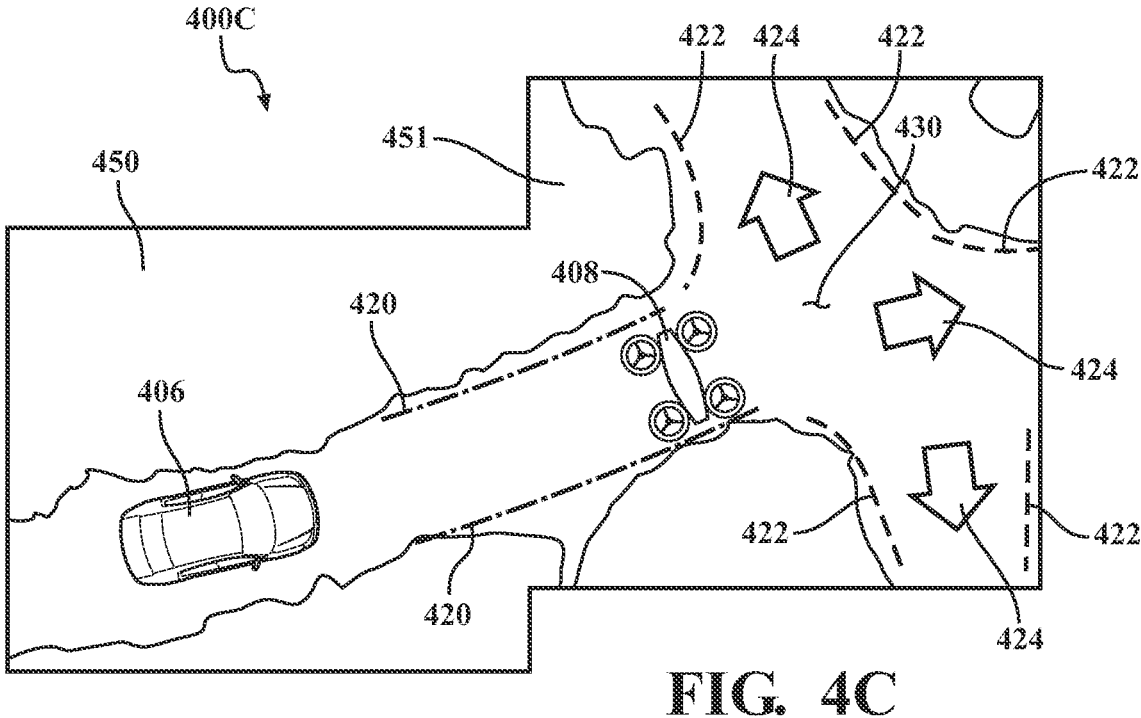
Figure 4D:
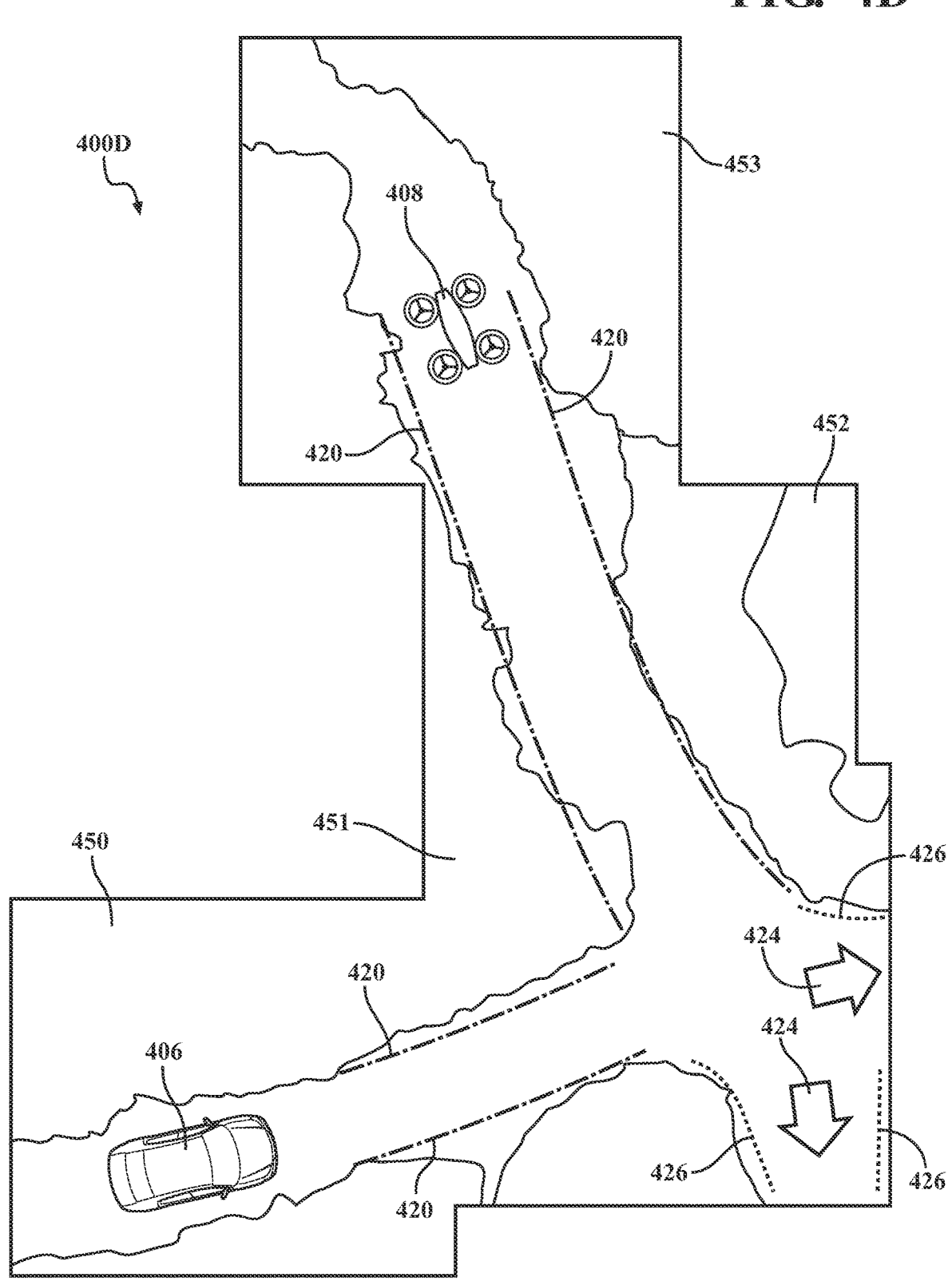

In order to better visualize this process, reference is made to FIG. 4A. Illustrated is an electronic representation of a sparse map 400A illustrating a portion of the off-road trail system 12 of FIG. 1. In this example, the sparse map 400A includes an image 450, which was captured by the aerial drone 300. The sparse map 400A also includes a vehicle icon 406, indicating the location of the vehicle 100 within the sparse map 400A, and an aerial drone icon 408, indicating the location of the aerial drone 300 within the sparse map 400A. The sparse map 400A may be stored within the data store(s) 220 as the sparse map(s) 224. In addition, the sparse map 400A may be displayed to the occupant of the vehicle 100 via the output system 140. For example, the output system 140 may include a vehicle head unit that includes a display for displaying information to the occupant of the vehicle 100, including the sparse map 400A.

The instruction module 212 includes instructions that cause the processor(s) 210 to control the aerial drone 300 to proceed along the off-road trail 13. As such, in this example, the drone control system 200 wirelessly sends an instruction to the aerial drone 300 to proceed along the off-road trail 13, wherein the aerial drone 300 continues to capture and send collected sensor data 222 to the drone control system 200. For example, referring to FIG. 4B, as the aerial drone 300 proceeds along the off-road trail 13 of FIG. 1, the aerial drone 300 continues to send captured sensor data to the drone control system 200. Here, the instruction module 212 includes instructions that cause the processor(s) 210 to receive the sensor data 222 from the aerial drone 300 and generate additional portions to the sparse map. In this example, the sparse map 400B now includes images 450 and 451. Furthermore, the instruction module 212 causes the processor(s) 210 to continue to determine if the off-road trail 13 has a positive or abandonment condition.

The instruction module 212 may cause the processor(s) 210 to utilize one or more discrete algorithms and/or models, such as neural networks, to process the images received from the aerial drone 300. Moreover, discrete algorithms, which may include image recognition algorithms and/or models, which may have been trained to identify off-road trails, determine positive and/or abandonment conditions, as well as be able to delineate the off-road trails utilizing indicators, such as the visual indicators 420, can be utilized and may form some the instructions stored within the instruction module 212. In some cases, there may be scenarios where the models and/or discrete algorithms utilized by the processor(s) 210 cannot determine with the appropriate confidence that an off-road trail has positive or abandonment conditions. In those cases, the instruction module 212 may cause the processor(s) 210 to inform the occupant of the vehicle 100 via the output system 140 regarding the low confidence in its determination. In some cases, the instruction module 212 may cause the processor(s) 210 to receive input from the occupant via the input system 145, wherein the occupant can select and or confirm if the off-road trail has a positive or abandonment condition.

The sparse map 400B can also include additional information not limited to just images captured by the aerial drone 300. For example, the instruction module 212 can cause the processor(s) 210 to provide visual indicators 420 that delineate the off-road trail 13 and provide some indication regarding the accessibility of the off-road trail 13 when a positive condition has been determined (i.e., that the vehicle 100 can navigate along the off-road trail 13). Here, the visual indicators 420 can be color-coded, such as green, indicating that the off-road trail 13 can be traversed by the vehicle 100. As to delineation, the visual indicators 420, as well as visual indicators 422 and 426, which will be described later, also delineate the trail. For example, the visual indicators 420 may essentially mark the lateral boundaries of the off-road trail. This information regarding delineation accessibility may be stored as part of the sparse map(s) 224.

Assuming that the off-road trail 13 has a positive condition, the instruction module 212 can cause the processor(s) 210 to instruct the aerial drone 300 to continue along the off-road trail 13 in continue to capture and send sensor data back to the drone control system 200 for processing and/or generating the sparse map 400B. In some cases, the aerial drone 300 may come to a portion of the off-road trail where the off-road trail branches into different sections. Moreover, as shown in FIG. 1, the off-road trail 13 branches into off-road trails 14, 16, and 18 at intersections 430. When this occurs, the instruction module 212 can cause the processor(s) 210 to either execute a preset operating plan or request navigation instructions from the occupant of the vehicle 100. For example, a preset operating plan may cause the aerial drone 300 to always follow a certain trail, such as the first off-road trail on the left, and continue until an abandonment condition is found.

If no preset operating plan is being executed, the instruction module 212 can cause the processor(s) 210 to request navigation instructions from the occupant of the vehicle 100. In one example, best shown in FIG. 4C, the sparse map 400C includes navigation icons 424, shown as arrows, pointing in different directions on the sparse map 400C. Also shown are visual indicators 422 of the off-road trails 14, 16, and 18 that may be color-coded to indicate that they have not yet been explored, such as with a yellow color. Depending on which of the navigation icons 424 is selected by the occupant of the vehicle 100, the aerial drone 300 will proceed along the appropriate off-road trail. Input may be received from the occupant of the vehicle 100 via the input system 145. In some cases, the input system 145 may be a touchscreen.

For this example, assume that the occupant has selected the navigation icon 424, which generally points along the off-road trail 14. When this occurs, the instruction module 212 can cause the processor(s) 210 to instruct the aerial drone 300 to proceed along the off-road trail 14. When this occurs, the aerial drone 300 continues to capture and send sensor data collected by the environment sensor(s) 320. As data is received from the aerial drone 300, the instruction module 212 can cause the processor(s) 210 to continue building the sparse map 400D, best shown in FIG. 4D. Here, the sparse map 400D now additionally includes the images 452 and 453 that may have been captured by the environment sensor(s) 320 of the aerial drone 300 and sent to the drone control system 200. In addition, like before, the instruction module 212 can cause the processor(s) 210 to determine if there is a positive condition or an abandonment condition. Again, when there is a positive condition, the instruction module 212 can cause the processor(s) 210 to instruct the aerial drone 300 to continue along the off-road trail 14. Also, the instruction module 212 can cause the processor(s) 210 to continue delineating the off-road trail 14 with visual indicators 420 that indicate that the off-road trail 14 has positive conditions and can be navigated by the vehicle 100.

Here, assume that the aerial drone 300 has reached the flooded area 30, best shown in FIG. 1. The flooded area 30 is essentially an abandonment condition because the vehicle 100 may not be able to traverse the flooded area 30. Here, the instruction module 212 can cause the processor(s) 210 to process the sensor data sent by the aerial drone 300 to determine that the flooded area 30 is an abandonment condition and that the off-road trail 14 should no longer be navigated along as the vehicle 100 would not be able to continue that way. When the abandonment condition is detected, the instruction module 212 can cause the processor(s) 210 to find another off-road trail. In this example, the instruction module 212 can cause the processor(s) 210 to instruct the aerial drone 300 to proceed along the off-road trail 16.

Figure 4E:
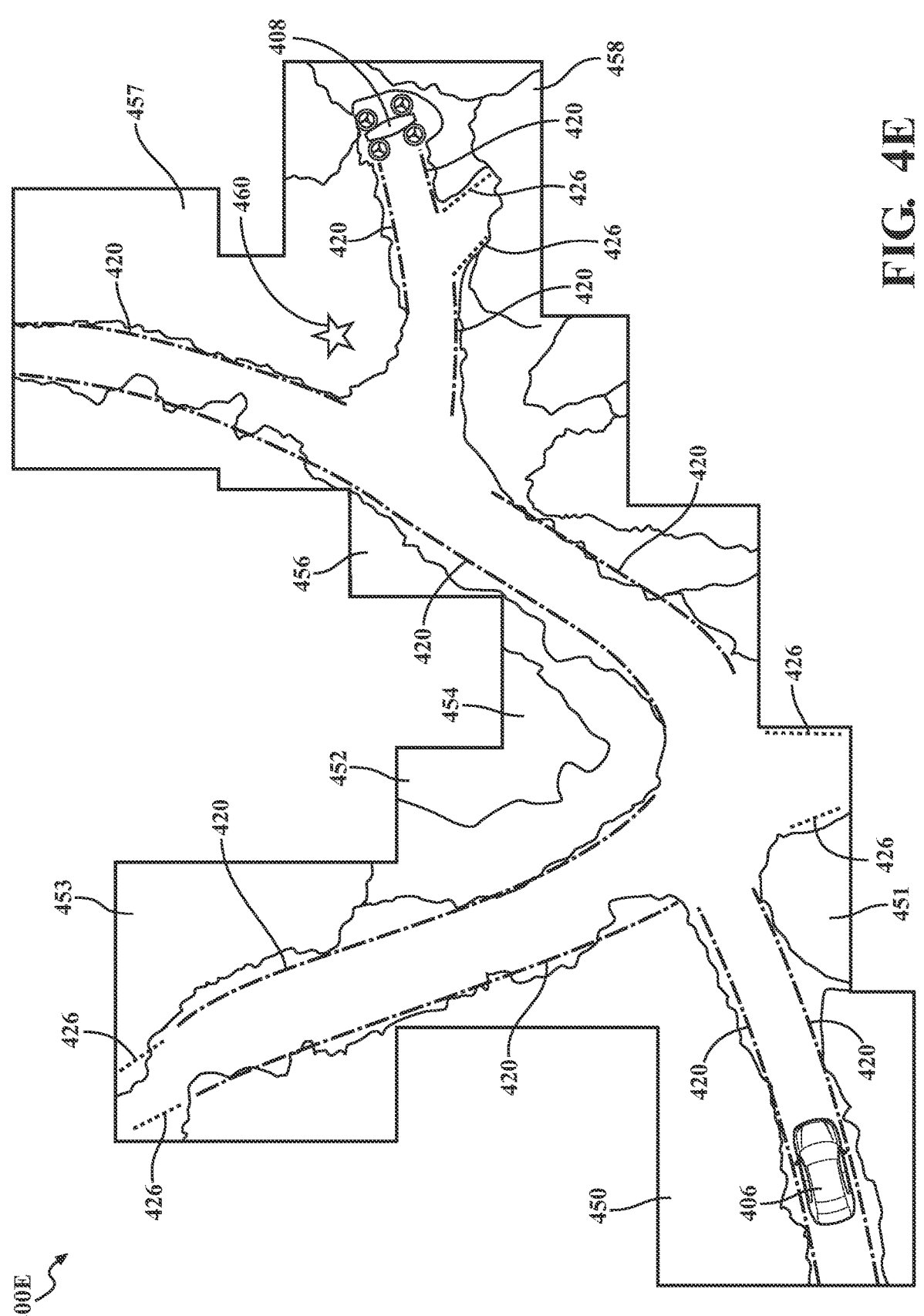

As before, as the aerial drone 300 proceeds along the off-road trail 16, the instruction module 212 can cause the processor(s) 210 to continue collecting sensor data from the aerial drone 300 and generating additional portions of the sparse map. For example, FIG. 4E illustrates a more complete sparse map that includes additional images 454, 456, 457, and 458. Additionally, like before, the instruction module 212 can cause the processor(s) 210 to continue delineating trails with appropriate indicators, such as the visual indicators 420, which may indicate that an off-road trail is navigable, visual indicators 426, which may indicate that an off-road trail is not navigable, and/or visual indicators 422 indicating that a particular off-road trail has yet to be explored. In one example, the visual indicators 426 may be color-coded red to indicate that a particular portion of an off-road trail is not accessible to the vehicle 100.

As such, the sparse maps, such as the sparse map 400E, generally include visual image information from images captured by the aerial drone 300 that have been stitched appropriately together. In addition to stitching these images together, indicators, such as the visual indicators 420, 422, 426, and the like, can also be integrated within the sparse maps to provide useful information to the occupant of the vehicle 100. Also, the sparse maps generated by the drone control system 200, such as the sparse map 400E, may be interactable. For example, using the input system 145, the occupant of the vehicle 100 can zoom, rotate, etc., the sparse map 400E to their liking. Generally, the aerial drone 300 may continue along a particular off-road trail until it reaches some preset distance from the vehicle 100 and/or reaches its maximum transmission range. For example, the instruction module 212 can cause the processor(s) 210 to determine the transmission range and control the aerial drone 300 such that it stays within the determined transmission range, so as to not lose communication with the vehicle 100.

As mentioned before, abandonment conditions generally indicate conditions that will prevent the vehicle 100 from proceeding further. As such, when the drone control system 200 detects abandonment conditions, such as floods, rock slides, debris, or other conditions that indicate that the vehicle 100 would not be able to navigate through, the drone control system 200 essentially instructs the aerial drone to find another off-road trail that would be more favorable. In addition, as mentioned before, positive conditions generally include conditions that indicate that the particular off-road trail would be navigable by the vehicle 100. As an addition, the occupant may also request that other features that are generally positive be identified, such as indicating where it would be good to camp, fish, rest, etc. For example, the sparse map 400E has a visual indicator 460 indicating an occupant identified positive condition, such as a good location for camping that the instruction module 212 caused the processor(s) 210 to determine by evaluating the sensor data collected by the aerial drone 300. When such a feature is detected, the drone control system 200 can have the feature marked on the sparse map and continue searching and/or the drone control system 200 can instruct the drone 300 to return to the vehicle 100. Of course, it should be understood that the drone control system 200 could also implement other control methodologies as well and should not be limited to just those specifically mentioned. Further still, in one example, it should be understood that any type of searching performed by the drone 300 can be canceled and reconfigured by the occupant or control algorithm at any time.

Figure 5:
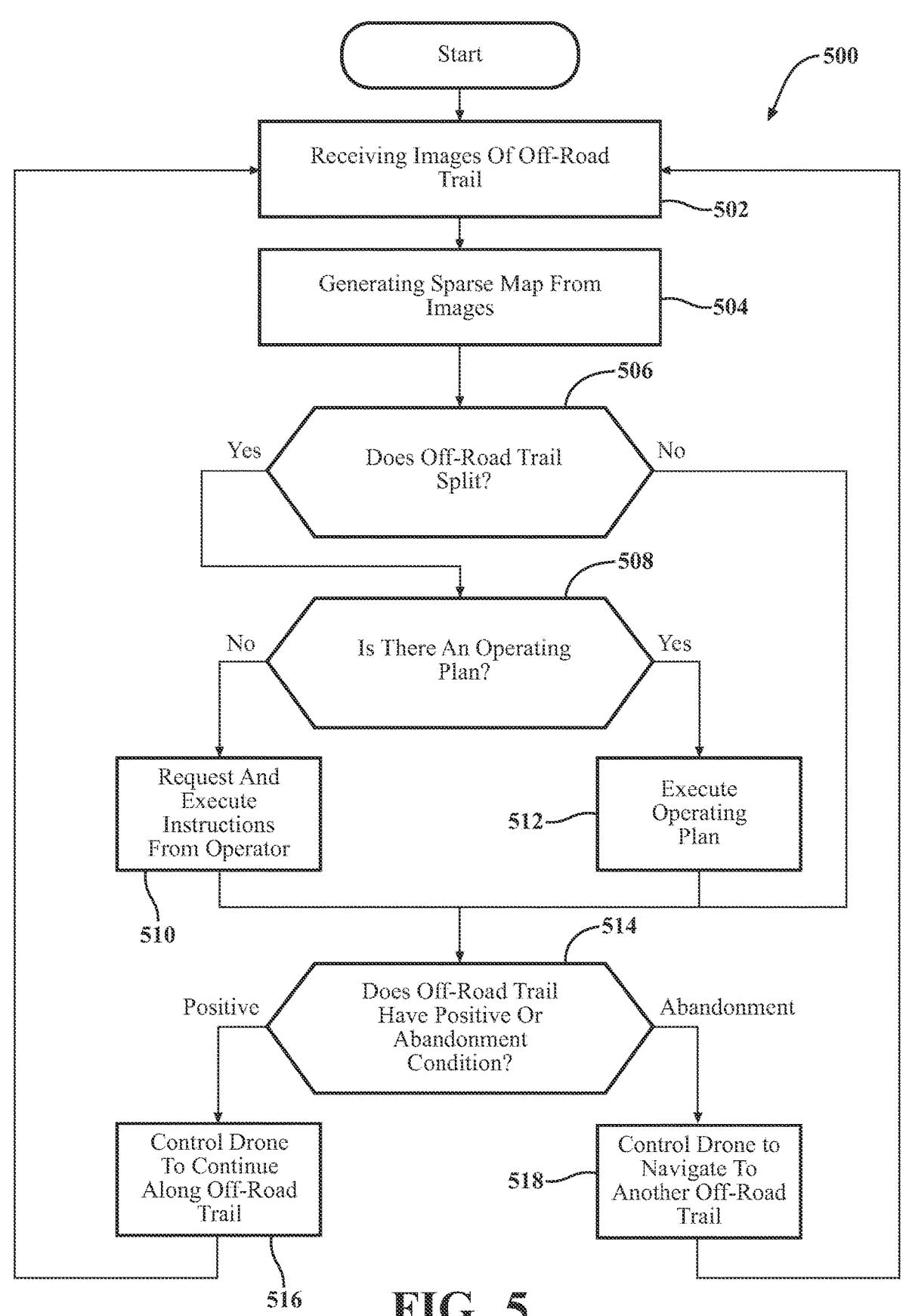
FIG. 5 illustrates a method for controlling an aerial drone for exploring off-road trails.

Referring to FIG. 5, a method 500 for controlling an aerial drone for exploring off-road trails is shown. The method 500 will be described from the viewpoint of the vehicle 100 in FIG. 2 and the drone control system 200 in FIG. 3. However, it should be understood that this is just one example of implementing the method 500. While method 500 is discussed in combination with the drone control system 200, it should be appreciated that the method 500 is not limited to being implemented within the drone control system 200, but is instead one example of a system that may implement the method 500.

In step 502, the instruction module 212 causes the processor(s) 210 to receive images of an off-road trail. Moreover, in one example, the processor(s) 210, receives images from an aerial drone, such as the aerial drone 300. These images may have been captured by one or more camera sensor(s) 324 mounted to the aerial drone 300.

In step 504, the instruction module 212 causes the processor(s) 210 to generate a sparse map from the previously received images. The generating of the sparse map may be performed by utilizing one or more discrete algorithms that perform image recognition and/or models that have been trained to process and interpret images to identify off-road trails, positive/abandonment conditions, etc. As mentioned before, the sparse map may include an image captured and transmitted from the aerial drone 300, as well as any indicators, such as visual indicators 420, 422, and/or 426, that identify the off-road trail if the off-road trail has been explored/not explored, if the off-road trail is not traversable, etc.

In step 506, the instruction module 212 causes the processor(s) 210 to determine if the off-road trail splits. If the off-road trail splits, the method proceeds to step 508, wherein the instruction module 212 causes the processor(s) 210 to determine if there is an operating plan. For example, an operating plan may dictate what the aerial drone 300 should do when an off-road trail splits, such as always taking a left trail/right trail, etc. If there is no operating plan, the method proceeds to step 510, wherein the instruction module 212 causes the processor(s) 210 to request instructions from the occupant of the vehicle 100 and execute any received instructions from the occupant of the vehicle 100.

If there is no split in the off-road trail or steps 510 and 512 have been executed, the method proceeds to step 514. In step 514, the instruction module 212 causes the processor(s) 210 to determine if the off-road trail has a positive or abandonment condition. As mentioned before, positive conditions can include conditions such as the ability of the vehicle 100 to traverse the off-road trail, favorable spots for camping, fishing, resting, etc., and the like. Abandonment conditions can include conditions that are not favorable, such as conditions that would prevent the vehicle 100 from traversing that particular portion of the offer of trail.

If conditions are determined to be positive, the method 500 proceeds to step 516, wherein instruction module 212 causes the processor(s) 210 to control the aerial drone 300 to continue along the off-road trail. Otherwise, the method 500 proceeds to step 518, wherein the instruction module 212 causes the processor(s) 210 to control the aerial drone 300 to find a different off-road trail. Once step 516 or 518 has been executed, the method 500 may return to step 502.

As such, the systems and methods described herein allow for the control of an aerial drone to capture images of off-road trails, determine positive/abandonment conditions, and/or generate sparse maps. By so doing, the occupant of a vehicle that is in communication with the aerial drone can know which off-road trails are traversable or otherwise favorable. By having this knowledge before actually traversing down a particular off-road trail, the operator of the vehicle can avoid traveling down off-road trails that will ultimately require the operator to turn their vehicle around or otherwise operate their vehicle in reverse.

Detailed embodiments are disclosed herein. However, it is to be understood that the disclosed embodiments are intended only as examples. Therefore, specific structural and functional details disclosed herein are not to be interpreted as limiting but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product, which comprises all the features enabling the implementation of the methods described herein and which, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
a processor;
a memory in communication with the processor, the memory including an instruction module having instructions that, when executed by the processor, cause the processor to:
determine, based on images of a first off-road trail captured by an aerial drone in communication with a vehicle, whether the first off-road trail has a positive condition indicating that the vehicle can physically traverse the first off-road trail or an abandonment condition indicating that the vehicle cannot physically traverse the first off-road trail due to an encumbrance that prevents the vehicle from traversing the first off-road trail; and
control the aerial drone to navigate to a second off-road trail when the first off-road trail has the abandonment condition.

2. The system of claim 1, wherein the instruction module further comprises instructions that, when executed by the processor, cause the processor to control the aerial drone to navigate along the first off-road trail when the first off-road trail has the positive condition.

3. The system of claim 1, wherein the instruction module further comprises instructions that, when executed by the processor, cause the processor to:
request navigation instructions from an occupant of the vehicle when the first off-road trail has neither the positive condition nor the abandonment condition; and
control the aerial drone to execute the navigation instructions from the occupant.

4. The system of claim 1, wherein the instruction module further comprises instructions that, when executed by the processor, cause the processor to:
request navigation instructions from an occupant of the vehicle when the first off-road trail branches into a plurality of trails; and
control the aerial drone to execute the navigation instructions from the occupant to navigate along one of the plurality of trails.

5. The system of claim 1, wherein the positive condition further includes a feature identified by the occupant.

6. The system of claim 1, wherein the instruction module further comprises instructions that, when executed by the processor, cause the processor to generate a sparse map based on the images captured by the aerial drone.

7. The system of claim 6, wherein the sparse map is interactable by an occupant of the vehicle.

8. The system of claim 1, wherein the instruction module further comprises instructions that, when executed by the processor, cause the processor to:
determine a transmission range between the aerial drone and the vehicle; and
control the aerial drone to operate within the transmission range.

9. A method comprising steps of:
determining, based on images of a first off-road trail captured by an aerial drone in communication with a vehicle, whether the first off-road trail has a positive condition indicating that the vehicle can physically traverse the first off-road trail or an abandonment condition indicating that the vehicle physically cannot traverse the first off-road trail due to an encumbrance that prevents the vehicle from traversing the first off-road trail; and
controlling the aerial drone to navigate to a second off-road trail when the first off-road trail has the abandonment condition.

10. The method of claim 9, further comprising the step of controlling the aerial drone to navigate along the first off-road trail when the first off-road trail has the positive condition.

11. The method of claim 9, further comprising the steps of:
requesting navigation instructions from an occupant of the vehicle when the first off-road trail has neither the positive condition nor the abandonment condition; and
controlling the aerial drone to execute the navigation instructions from the occupant.

12. The method of claim 9, further comprising the steps of:
requesting navigation instructions from an occupant of the vehicle when the first off-road trail branches into a plurality of trails; and
controlling the aerial drone to execute the navigation instructions from the occupant to navigate along one of the plurality of trails.

13. The method of claim 9, wherein the positive condition further includes a feature identified by the occupant.

14. The method of claim 9, further comprising the step of generating a sparse map based on the images captured by the aerial drone.

15. The method of claim 14, wherein the sparse map is interactable by an occupant of the vehicle.

16. The method of claim 9, further comprising the steps of:
determining a transmission range between the aerial drone and the vehicle; and
controlling the aerial drone to operate within the transmission range.

17. A non-transitory computer-readable medium including instructions that, when executed by a processor, causes the processor to:
determine, based on images of a first off-road trail captured by an aerial drone in communication with a vehicle, whether the first off-road trail has a positive condition indicating that the vehicle can physically traverse the first off-road trail or an abandonment condition indicating that the vehicle cannot physically traverse the first off-road trail due to an encumbrance that prevents the vehicle from traversing the first off-road trail; and control the aerial drone to navigate to a second off-road trail when the first off-road trail has the abandonment condition.

18. The non-transitory computer-readable medium of claim 17, further including instructions that, when executed by the processor, cause the processor to control the aerial drone to navigate along the first off-road trail when the first off-road trail has the positive condition.

19. The non-transitory computer-readable medium of claim 17, further including instructions that, when executed by the processor, cause the processor to:

request navigation instructions from an occupant of the vehicle when the first off-road trail has neither the positive condition nor the abandonment condition; and control the aerial drone to execute the navigation instructions from the occupant.

20. The non-transitory computer-readable medium of claim 17, further including instructions that, when executed by the processor, cause the processor to:

request navigation instructions from an occupant of the vehicle when the first off-road trail branches into a plurality of trails; and control the aerial drone to execute the navigation instructions from the occupant to navigate along one of the plurality of trails.

\* \* \* \* \*